United States Patent [19]
Kemp

[11] Patent Number: 5,170,989
[45] Date of Patent: Dec. 15, 1992

[54] SEALING ASSEMBLY FOR VALVE MEMBER

[75] Inventor: Willard E. Kemp, Blue Springs, Mo.

[73] Assignee: Fike Corporation

[21] Appl. No.: 829,224

[22] Filed: Feb. 3, 1992

[51] Int. Cl.⁵ .............................................. F16K 5/06
[52] U.S. Cl. ................................. 251/174; 251/175; 251/315
[58] Field of Search ............... 251/170, 174, 175, 314, 251/315

[56] References Cited

U.S. PATENT DOCUMENTS

| | | | |
|---|---|---|---|
| 3,331,581 | 7/1967 | O'Connor | 251/170 X |
| 3,556,571 | 1/1971 | Paul, Jr. | 251/315 X |
| 4,157,170 | 6/1979 | McClurg | 251/315 |
| 4,290,581 | 9/1981 | Moran et al. | 251/174 X |

Primary Examiner—John C. Fox
Attorney, Agent, or Firm—Dodge, Bush, Moseley & Riddle

[57] ABSTRACT

A seat assembly (28) for a valve member (20) includes a seat carrier (40) defining a pocket to receive a rigid seat ring (42). The outer peripheral surface (56) of the rigid seat ring (42) is spaced radially from the inner peripheral surface (45) of the seat carrier (40) to define a radial clearance therebetween of at least around 0.001 inch per inch of flow passage diameter. The sealing surface (58) of the seat ring (42) extends at 45 degrees to the longitudinal axis of the flow passage and the flexing and expansion of rigid seat ring (42) when the valve member (20) is moved to closed position permit the seat ring (42) to conform to irregularities in the adjacent mating sealing surface.

17 Claims, 4 Drawing Sheets

SEALING ASSEMBLY FOR VALVE MEMBER

FIELD OF THE INVENTION

This invention relates to a sealing assembly for a valve member movable between open and closed positions relative to a flow passage, and more particularly to such a sealing assembly for a valve member having a frusto-conical or spherical sealing surface, such as a ball valve or swing check valve.

BACKGROUND OF THE INVENTION

A valve such as a ball valve has a spherical ball member rotated between open and closed positions relative to a flow passage through the body of the valve. Thus, the sealing surface of the ball member is a spherical sealing surface. The annular seat member contacting the ball member to provide sealing normally is of a generally frusto-conical shape. The balls and seats in ball valves and the swing discs and mating seats in check valves encounter similar problems. It is very difficult to make the seats or the mating areas completely flat and perfectly uniform. It is necessary that one or both of the mating seat members deflect in order to make tight sealing contact. Two methods are presently used to achieve sealing between mating surfaces for such ball valves and check valves. In one method low modulus of elasticity seat materials are used such as plastic materials. The valve bodies are usually made of steel with a modulus of 29 million pounds and the mating contacting seat members are frequently made of plastic with a modulus of less than one million pounds. The low modulus materials readily deform against the sealing surface to make sealing contact.

In another method the seat members are sometimes made of materials having a high modulus of elasticity and are then lapped together to achieve a necessary line contact which provides for a perfect seal. Such lapping is achieved between mating flat surfaces or mating spherical or conical surfaces. Since it is nearly impossible to make two separate pieces which will fit in such close contact, lapping the mating sealing surfaces together is usually the only choice.

There are certain disadvantages in the two methods set forth above. For example, if low modulus seats are used, they are generally made of plastic materials which may fail at high temperatures. Also, the plastic materials deflect enough to make a seal but under conditions of even higher stress may continue to deflect or distort. Often this results in greater than desired lateral movement of the seal. Plastic materials with low modulus are generally also relatively high wear materials and therefore wear, erosion or abrasion of the seals is a major problem. High modulus seats lapped together are extremely expensive to manufacture. Also, high modulus seats lapped together at one temperature will frequently distort at some other temperature, resulting in a slight separation and a loss of perfect seal contact.

SUMMARY OF THE INVENTION

The present invention is particularly directed to a seat assembly for sealing against a spherical or frusto-conical sealing surface for a ball valve member or swing check member which is movable between open and closed positions relative to a flow passage. The seat assembly is formed of two separate members including an annular carrier defining a pocket receiving a substantially rigid seat ring spaced radially from the carrier. The rigid seat ring deforms radially into the radial space between the carrier and seat ring to conform to the adjacent sealing surface and forms a primary seal. The seat ring contacts the sealing surface at around 45 degrees to the flow line for both a ball valve and check valve. The seat carrier which receives the seat ring is relatively rigid at its seat support area which contacts and supports the seat ring. Also, the seat carrier has stop means which limits the movement of the associated valve member thereby preventing overstressing of the seat ring beyond its yield point.

The metal seat ring contacts the adjacent valve member at around 45 degrees and a radial clearance between the seat ring and the carrier preferably around 0.002 inch per inch of diameter of the flow passage has been found to be satisfactory. The metal seat ring has a relatively small cross sectional area so that it may flex in a radial direction to conform to irregularities in the mating spherical or frusto-conical sealing surface.

The seat ring is made of sufficiently strong material so that in the radial direction it can carry the entire pressure differential across the seat without overstressing. However, the stress is deliberately maintained relatively high to allow maximum flexibility to deform peripherally. The seat ring does not deform sufficiently to make contact with the seat carrier in the radial direction, although contact may take place at certain areas. The seat ring is always free to expand and conform to the irregularities of the mating surface without overstressing the seat ring.

One embodiment of a metal seat assembly of the present invention for a ball valve includes an annular carrier mounted in a recess about a flow passage. In the closed position of the ball member, the ball member is urged by upstream fluid pressure against the downstream seat assembly. The metal seat assembly includes an annular carrier forming a pocket receiving the primary rigid seat ring therein in a radially spaced relation. The rigid seat ring flexes radially into the radial space between the seat ring and carrier upon initial contact by the ball member to conform to the spherical sealing surface of the ball member and form a primary seal.

The contact area between the rigid seat ring and the spherical surface of the ball member is around 45 degrees to the direction of longitudinal movement of the ball member resulting from the upstream fluid pressure when the ball member is in closed position. The ball member flexes or expands the seat ring in a radial direction from a camming action and urges the carrier assembly longitudinally against an abutment of the valve body to limit longitudinal movement.

Another embodiment of the invention is utilized with a check valve in which a movable check valve disc is mounted for pivotal movement between open and closed positions relative to the flow passage. The check valve disc seats in closed position upon a reverse fluid flow against a fixed frusto-conical sealing surface on the valve body about the flow passage. The carrier for the metal seat ring is positioned on the check valve disc for movement therewith and defines an annular groove facing outwardly in a direction transversely of the flow passage to receive the rigid seat ring therein in a radially spaced relation from the bottom of the groove. When the check valve disc is urged by fluid pressure into closed position, the rigid seat ring contacts the fixed frusto-conical sealing surface and flexes in a camming action to form a tight seal which conforms to any ovality or peripheral undulations in the fixed frusto-conical sealing surface.

It is an object of this invention to provide a sealing assembly for a frusto-conical or spherical sealing surface having a generally rigid seat ring which flexes radially upon contact with the frusto-conical or spherical sealing surface to conform to ovality or peripheral undulations in the sealing surface resulting from manufacturing tolerances.

It is another object of this invention to provide such a seat ring for a ball valve or a check valve with the seat ring having a relatively high modulus of elasticity for sealing against a frusto-conical or spherical sealing surface.

It is a further object of this invention to provide such a seat ring formed of a material which deforms radially at a predetermined high temperature but yet provides an emergency seal.

It is a further object of this invention to provide for a ball valve a sealing assembly forming a pocket for a rigid seat ring and permitting the metal seat ring to flex radially outwardly to conform to any imperfections in the spherical sealing surface of the ball member upon urging of the ball member against the downstream sealing assembly in closed position.

It is an additional object of this invention to provide a sealing assembly for a check valve in which a rigid seat ring fits in a carrier on the check valve disc to flex radially inwardly upon contact of the disc with a fixed frusto-conical seat for conforming to imperfections in the fixed seat.

Other objects, features, and advantages of the invention will become more apparent after referring to the following specification and drawings.

DESCRIPTION OF THE INVENTION

Figure 1:
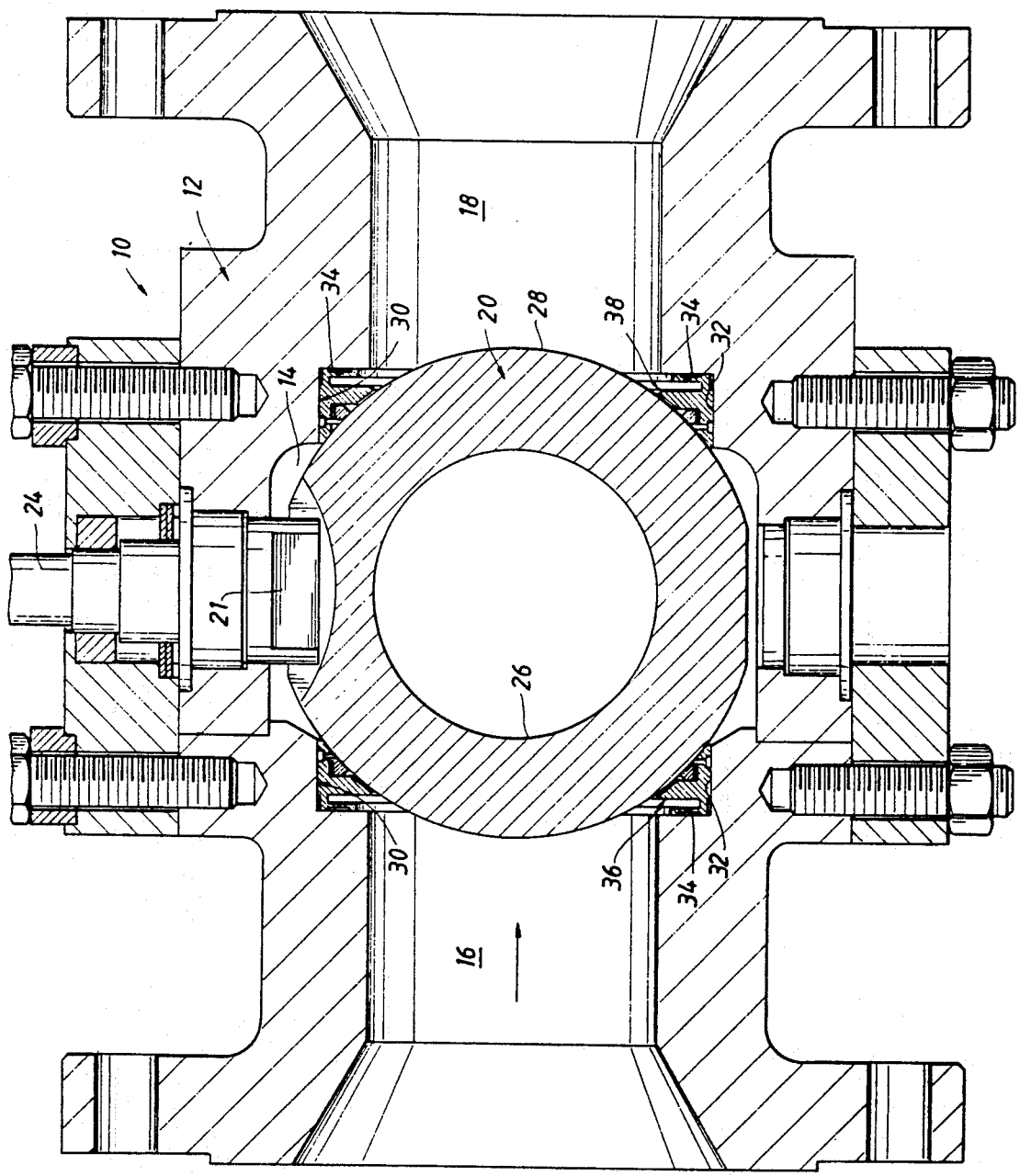
FIG. 1 is a sectional view of one embodiment of the invention in which the seat or sealing assembly comprising the present invention is utilized with a ball valve.
Figure 2:
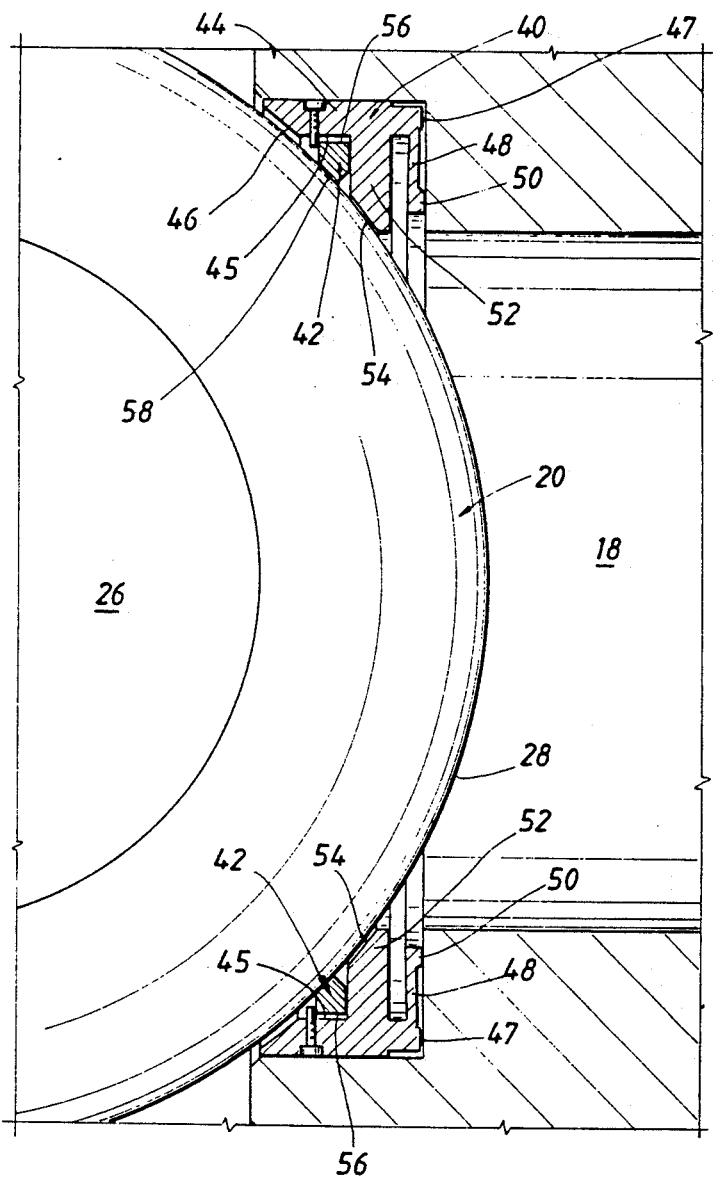
FIG. 2 is an enlarged section of the downstream sealing assembly with the ball valve member shown initially contacting the rigid seat ring within the seat carrier.
Figure 3:
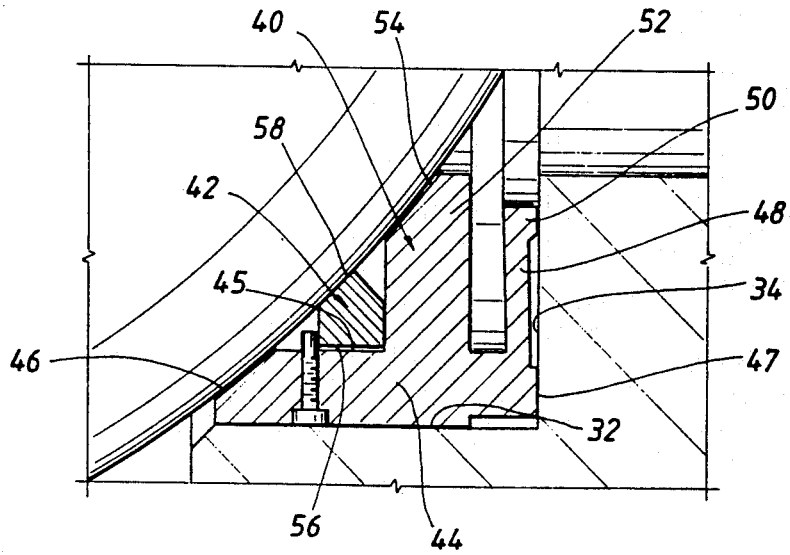
FIG. 3 is a sectional view similar to FIG. 2 but showing the downstream sealing assembly of FIG. 2 with the carrier abutting the shoulder and the seat ring in sealing contact with the spherical sealing surface of the ball valve member.

Referring first to the embodiment of FIGS. 1-3 in which the present invention is illustrated for use with the ball valve, a ball valve is shown generally at 10 including a body 12 having a valve chamber 14 therein with upstream and downstream flow passages 16, 18 communicating with valve chamber 14. A ball valve member generally indicated at 20 is mounted within valve chamber 14 for floating back and forth movement. A stem indicated generally at 24 has a key 21 fitting within a slot in ball valve member 20 for rotation of ball valve member 20 between open and closed positions relative to flow passages 16, 18 and may be actuated either manually or automatically as well known.

Ball valve member 20 has a central bore 26 and an outer spherical sealing surface 28. Annular recesses 30 are provided about flow passages 16 and 18. Each recess 30 includes an outer peripheral surface 32 extending in a direction generally parallel to flow passages 16, 18 and an annular abutment 34 extending at right angles to outer peripheral surfaces 32.

Upstream and downstream seat or sealing assemblies 36 and 38 are mounted within recesses 30 with each seat assembly being generally identical. Referring particularly to downstream seat assembly 38, seat assembly 38 includes two separate members comprising a seat carrier 40 of a high modulus material, such as titanium, and a rigid seat ring 42 also of a high modulus material such as titanium received within a pocket formed by seat carrier 40. Carrier 40 has an annular body forming an outer peripheral leg 44 adjacent outer peripheral surface 32 of downstream recess 30. Leg 44 has an inner peripheral surface 45, an inclined front end or lip 46, and a rear end 47 in opposed relation to abutment 34. A rear spring leg or finger 48 has an enlarged extending end 50 which is normally urged by fluid pressure into sealing engagement with annular abutment 34. An intermediate leg 52 extends at right angles to leg 44 in a direction generally transversely of the longitudinal axis of flow passages 16 and 18 and has an extending inclined end surface or lip 54 extending at an angled relationship with respect to the longitudinal axis of flow passage 18. Leg 52 forms a shoulder on which seat ring 42 seats and is supported. A space is formed between finger 50 and leg 52 to permit fluid pressure therebetween for urging enlarged end 50 into tight sealing engagement with abutment 34. A pocket is formed in the space between legs 44 and 52 and rigid seal ring 42 fits therein against leg 52.

Rigid seat ring 42 has an outer peripheral surface 56 which is spaced radially from inner peripheral surface 45 of leg 44 to provide a radial clearance of preferably around .002 inch per inch of diameter of flow passages 16, 18 in order to permit expansion of rigid seat ring 42 relative to carrier 40. An inner peripheral contact face 58 on rigid seat ring 42 is inclined at an angle of around 45 degrees with respect to the longitudinal axis of flow passage 18 and is adapted to contact in sealing relation the spherical sealing surface 28 of ball member 20. Rigid seat ring 42 is preferably formed of metal having a Young's modulus of elasticity of at least 5 to 6 million pounds and preferably between around 13 to 30 million pounds. A material which has been found to be satisfactory for seat ring 42 is titanium. It is noted that plastic materials have a modulus of elasticity below 2 million pounds so rigid ring 42 has a modulus of elasticity at least three times (6 million pounds) the modulus of elasticity of plastic materials and preferably around ten times (20 million pounds) the modulus of elasticity of plastic materials commonly utilized as resilient seals, such as polytetrafluoroethylene. In order for seat ring 42 to expand or flex radially upon contact with ball valve member 20 in the closed position thereof with upstream fluid pressure urging ball valve member 20 against seat assembly 38, seat ring 42 is formed of a predetermined minimal cross sectional area A in square inches in accord with the following formula:

$$A > PD \times \frac{L}{2S} \text{ where}$$

A = Cross sectional area of seat ring in square inches
P = Maximum operating pressure of valve in psi
D = Diameter of seat ring contact in inches
L = Length of seat ring in inches
S = Maximum working stress in psi
E = Young's modulus of elasticity in pounds For example, with ball valve 20 having a bore 26 of a diameter of 3 inches, seat ring 42 formed of a titanium material has a thickness of 0.12 inch and a width of 0.12 inch with a cross sectional area A1 of 0.0144 square inch. As calculated by the above formula with P=2000, D=4, L=0.12, S=30000 and E=15×10$^6$, A is calculated by $$A > PD \times \frac{L}{2S} \quad \frac{(2000)(4)(.12)}{2 \times (30000)} = 0.012 \text{ sq. inch}$$

As a further design limit for the minimal cross sectional area A of seat ring 42, area A should be designed in accord with another formula as follows:

$$A < \frac{1000 \, PDL}{E} \text{ and } > \frac{100 \, PDL}{E}$$

$$A < \frac{(1000)(2000)(3)(.12)}{15 \times 10^6} = 0.048 \text{ sq. inch } A >$$

$$\frac{(100)(2000)(3)(.12)}{15 \times 10^6} = .0048 \text{ sq. inch}$$

In operation, upon movement of valve 20 to closed position, upstream fluid pressure in flow passage 16 urges ball valve member 20 downstream into camming contact with inclined sealing face 58 on rigid seat ring 42 and spring leg 48 deflects with rear end 47 of carrier 40 abutting shoulder 34. Seat ring 42 flexes radially outwardly upon such contact with face 58 conforming to spherical sealing surface 28 of ball member 20 to form a sealing relation. Surfaces at 46 and 54 remain in spaced relation to spherical surface of ball member 20 but may act as stops in the event seat ring 42 is overstressed. Thus, seat ring 42 is free to expand and conform to the irregularities of the mating spherical surface 28.

It is also possible to manufacture the seat ring of a material which may melt or weaken at certain temperatures. In such a case the seat ring will be strong enough to take the pressure differential without being supported in the radial direction, but at elevated temperatures, the seat ring will be overstressed and will then make contact entirely around the radial periphery. In one variation, the seat ring would still be in contact with the mating surface, although would no longer have the capability to overcome irregularities, it would nevertheless function for emergency purposes. In another embodiment, the seat ring 42 could be designed so that when it expands radially into the carrier 40, the carrier 40 itself makes contact with the mating surface such as the extending end of lip 54, again providing a seat ring 42 that will not overcome small irregularities but which is sufficient for emergency purposes. A seat ring formed of a plastic material having a modulus of elasticity less than around 6 million pounds tends to deform or deteriorate at temperatures around 600° to 700° F. and lip 54 would then provide metal to metal contact with ball member 20.

While ball valve member 20 has been shown in the drawings as a floating type ball valve, it is to be understood that the present invention may be utilized for a trunnion type ball valve. The lower cover plate as shown in FIG. 1 is adapted to receive a trunnion if desired.

Figure 4:
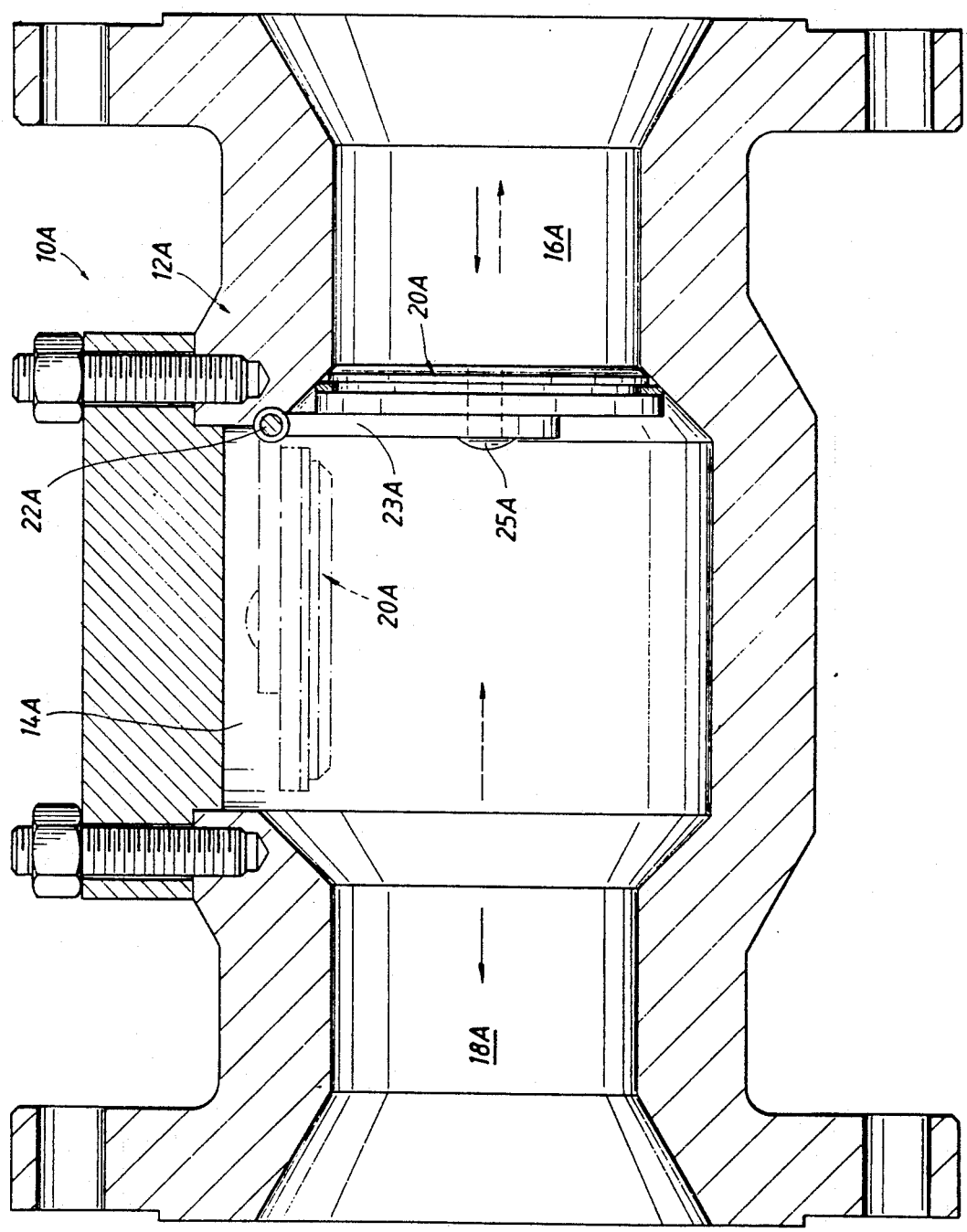
FIG. 4 is a perspective of a further embodiment of this invention in which the sealing assembly is utilized with a check valve with the rigid seat ring received within a groove of the valve disc.
Figure 5:
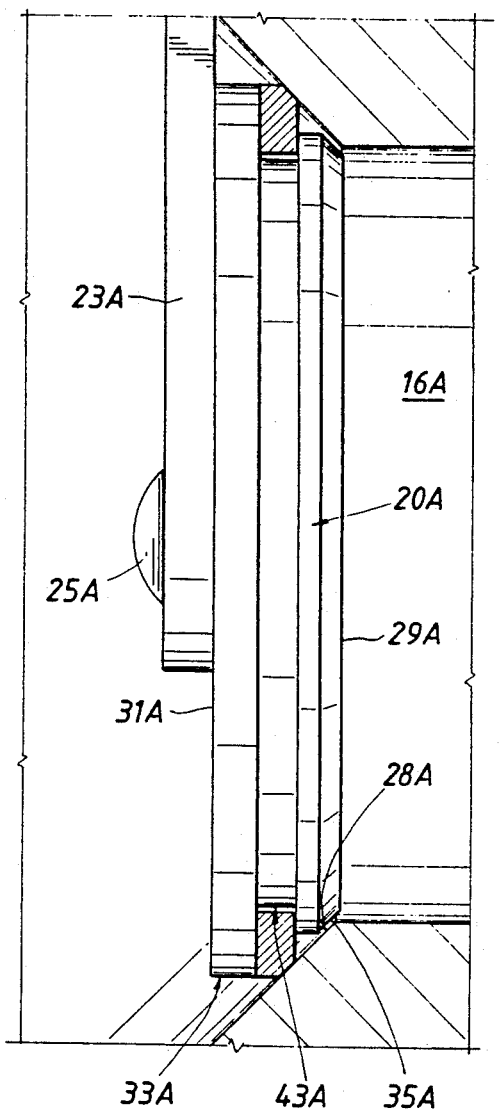
FIG. 5 is an enlarged sectional view of the check valve disc shown in initial sealing relation with the frusto-conical surface of the valve body.
Figure 6:
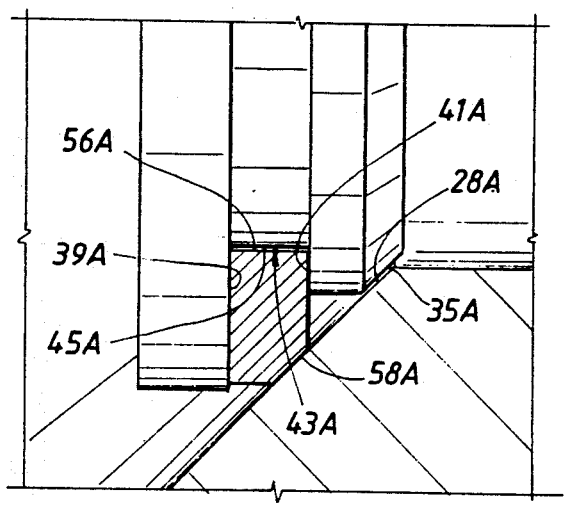
FIG. 6 is an enlarged sectional view of the seat assembly comprising the present invention with the rigid seat ring shown in sealing relation against the frusto-conical sealing surface of the valve body.

Referring now to FIGS. 4-6, another embodiment of the sealing assembly of the present invention is illustrated for use with a swing check valve. Swing check valve 10A has a valve body 12A defining an upstream flow passage 16A and a downstream flow passage 18A in normal operation of check valve 10A. A valve chamber is shown at 14A and a swing check valve 20A is shown mounted in valve chamber 14A for pivotal movement about a pivot 22A. A strap or bracket 23A is of an angle-shape and check valve disc 20A is loosely mounted on a pivot 25A of strap 23A.

During normal operation, check valve 20A is in a raised upper position within chamber 14A to permit normal fluid flow between upstream flow passage 16A and downstream flow passage 18A. During a reverse fluid flow, check valve 20A moves downwardly by gravity and is assisted by the fluid flow from fluid passage 18A as shown in broken lines in movement to a closed position to prevent reverse flow from passage 18A to passage 16A.

Referring now particularly to FIGS. 5 and 6, a frusto-conical seat 28A about flow passage 16A is inclined at an angle of around 45 degrees and forms a sealing surface against which check valve disc 20A seats. Valve disc 20A includes a front face 29A and an opposed rear face 31A with an annular peripheral surface generally indicated at 33A extending between faces 29A and 31A. Peripheral surface 33A at its front corner or rim adjacent front face 29A has an inclined corner surface 35A inclined at around 45 degrees relative to the longitudinal axis of flow passage 16A and is positioned adjacent frusto-conical seat 28A.

Seat assembly 38A is carried by valve disc 16A. An annular groove about peripheral surface 33A defines parallel surfaces 39A and 41A extending in a direction transversely to the longitudinal axis of flow passage 16A. A bottom surface or bottom 45A of groove 43A connects parallel surfaces 39A and 41A and extends in a direction generally parallel to the longitudinal axis of flow passage 16A. The groove 43A defined by surfaces 39A, 41A, and 43A thus forms a carrier to receive a rigid seat ring generally indicated at 42A positioned within groove 43A between parallel surfaces 39A and 41A. The inner peripheral surface 56A of rigid seat ring 42A is spaced from the bottom 45A of groove 43A a distance at least 0.002 inch per inch of diameter for the flow passage to form a radial clearance or space therebetween in which seat ring 42A may flex or contract. Rigid seat ring 42A has an inclined corner surface 58A which is inclined at an angle of around 45 degrees with respect to the longitudinal axis of flow passage 16A and is adapted to seal against frusto-conical seat 28A to form a seal therewith.

In operation, upon a reversal of fluid flow in check valve 10A, check valve disc 20A falls downwardly initially by gravity and fluid pressure in passage 18A urges disc 20A into tight sealing relation with frusto-conical seat 28A. Initial contact with seat 28A is made by corner sealing surface 58A of rigid seat ring 42A with seat ring 42A being cammed inwardly to deflect radially inwardly thereby to permit surface 58A to conform to the sealing surface of frusto-conical seat 28A for forming a sealing relation of check valve member 20A results in corner surface 35A contacting frusto-conical seat.

Rigid seat ring 42A is designed in accordance with seat ring 42 of the embodiment shown in FIGS. 1-3. For example, check valve 10A for a diameter of 2 for flow passages 16A and 18A has a seat ring 42A formed of a titanium material. Seat ring 42A has a cross sectional area A of 0.0144 square inches with a thickness of 0.12 inch and a width of 0.12 inch. As calculated by the above formula $$A > PD \times \frac{L}{2S}$$

for the embodiment of FIGS. 1-3 with P=2000, D=3, L=0.12, S=40000, and E=30×10$^{-6}$, A is required to be at least 0.0009 square inch. A is also designed to be in accord with the formula $$A < \frac{1000\ PDL}{E} \text{ and } > \frac{100\ PDL}{E}$$

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a ball valve having a body defining a valve chamber and upstream and downstream flow passages, and a ball member having a spherical sealing surface mounted within said valve chamber for movement between open and closed positions relative to the flow passages;
   a downstream seat assembly for sealing against the spherical sealing surface of said ball member in the closed position of said ball member, said seat assembly comprising:
   an outer rigid carrier having an inner peripheral surface and an annular shoulder extending at right angles to said inner peripheral surface to define a pocket therebetween; and
   an inner generally rigid seat ring forming a primary seal for said ball member mounted within said pocket for seating against said annular shoulder of said carrier in a longitudinal direction and spaced radially from said inner peripheral surface of said carrier to define a radial clearance therebetween, said seat ring having an inner peripheral surface extending generally around 45 degrees relative to the axis of the flow passage for sealing against the spherical surface of the ball member;
   said ball member in the closed position being urged against said inner seat ring, said inner seat ring being urged longitudinally against said carrier and flexing said seat ring radially outwardly into said radial clearance to conform to the outer spherical sealing surface of said ball member for forming a primary seal therewith.

2. In a ball valve as set forth in claim 1 wherein said radial clearance is at least around 0.001 inch per inch of diameter of said flow passages.

3. In a ball valve as set forth in claim 1 wherein said rigid carrier and said rigid seat ring are formed of metal to provide metal-to-metal sealing contact with the spherical sealing surface of said ball member.

4. In a ball valve as set forth in claim 1 wherein said valve body has an annular recess receiving said carrier and defining a rear abutment, and said carrier has a rear leg in opposed relation to said abutment, said rear leg being spring urged toward said ball member and bottoming against said abutment when said ball valve member is in closed position.

5. In a ball valve as set forth in claim 1 wherein said valve body has an annular recess about said downstream flow passage for receiving said downstream seat assembly, said recess defining an annular abutment and an outer peripheral surface extending at right angles to each other, said carrier forming a metal-to-metal seal with said abutment shoulder.

6. In a ball valve as set forth in claim 5 wherein said carrier includes a transverse leg extending in a direction transversely of the longitudinal axis of said downstream flow passage to define said annular shoulder of said pocket, and a rear leg spaced rearwardly of said transverse leg and extending in a direction generally parallel to said transverse leg, said rear leg sealing against said abutment of said recess.

7. In a ball valve as set forth in claim 1 wherein the cross sectional area A in square inches of said rigid seat ring is at least greater than $$PD \times \frac{L}{2S}$$

where:
P—is the maximum operating pressure in pounds per square inch (psi);
D—is the contact diameter in inches of the rigid seat ring against the spherical sealing surface of the ball member;
L—is the length of the seat ring in inches; and
S—is the maximum working stress of the seal ring in pounds per square inch (psi).

8. In a ball valve as set forth in claim 1 wherein the cross sectional area A in square inches is less than $$\frac{1000\ PDL}{E}$$

where:
P—is the maximum operating pressure in pounds per square inch (psi);
D—is the contact diameter of the seat ring in inches;
L—is the length of the seat ring in inches; and
E—is the modulus of elasticity in pounds.

9. In a ball valve as set forth in claim 8 wherein the cross sectional area A in square inches is greater than $$\frac{100\ PDL}{E}.$$

10. In a ball valve as set forth in claim 1 wherein said seat ring has a modulus of elasticity of at least 6 million pounds.

11. In a ball valve as set forth in claim 1 wherein said seat ring is formed of a metallic material having a modulus of elasticity between around 13 and 30 million pounds.

12. A ball valve comprising:
a valve body having a valve chamber with upstream and downstream flow passages communicating with said valve chamber;
a ball member mounted within said valve chamber for rotative movement between open and closed positions and having an outer spherical sealing surface;
an annular recess in said body about said downstream flow passage defining an annular abutment and an outer peripheral wall extending at right angles to said abutment; and
a downstream seat assembly mounted within said recess and defining a rear surface for sealing against said annular abutment; said seat assembly including a seat carrier having an inner peripheral surface and an annular shoulder extending at right angles to said inner peripheral surface to define a pocket therebetween for receiving a rigid seat ring forming a primary seal for said ball member;
said rigid seat ring having an outer peripheral surface spaced radially from the inner peripheral surface of said carrier to form a radial space therebetween and adapted to expand radially into said radial space upon contact with the spherical sealing surface of said ball member in the closed position thereof for conforming to said spherical sealing surface and forming a primary seal for said ball member.

13. A ball valve as set forth in claim 12 wherein said seat ring is formed of metal having a modulus of elasticity over 6 million pounds.

14. A ball valve as set forth in claim 12 wherein said seat ring is formed of a plastic material having a modulus of elasticity less than around 6 million pounds and deteriorates at a relatively high temperature over around 600° F.

15. A ball valve as set forth in claim 14 wherein said ball member contacts said carrier in metal to metal relation upon deterioration of said plastic seat ring.

16. A ball valve as set forth in claim 12 wherein said carrier comprises a pair of legs positioned at right angles to each other to define the pocket receiving said seat ring, one of said legs extending in a direction transversely of said downstream flow passage and forming said annular shoulder.

17. A ball valve as set forth in claim 16 wherein said carrier defines a third leg extending at right angles to said downstream flow passage and positioned in sealing contact with said annular abutment of said recess.

* * * * *